United States Patent Office 3,814,625
Patented June 4, 1974

3,814,625
FORMATION OF TUNGSTEN AND MOLYBDENUM CARBIDES
Ronald Harvey Lewin, Beaconsfield, and Cecil Hayman, Rickmansworth, England, assignors to Fulmer Research Institute Limited, Buckinghamshire, England
No Drawing. Filed Oct. 6, 1971, Ser. No. 187,194
Claims priority, application Great Britain, Oct. 8, 1970, 47,981/70
Int. Cl. C23c *11/08*
U.S. Cl. 117—71 M          9 Claims

ABSTRACT OF THE DISCLOSURE

The invention is for methods for the formation of tungsten and molybdenum carbides or mixtures thereof, the method comprising effecting a vapour phase chemical interaction between (1) a metal hexafluoride wherein the metal is selected from the groups consisting of tungsten, molybdenum and mixtures thereof, (2) a reactable hydrocarbon and (3) hydrogen, said interaction being effected at reaction temperatures between 400° C. and 1000° C. and with a carbon to hydrogen ratio in the mixture sufficiently low to ensure substantially no carbon is deposited as the required carbide is formed. The method is generally effected at reaction temperatures between 500° C. and 900° C. It is preferred that the reaction mixture consists of tungsten hexafluoride, benzene, toluene or xylene and hydrogen. The hydrocarbon however may be any one of a wide range of hydrocarbons that are vaporisable at the reaction temperatures and which will undergo reaction with the other components to produce the required carbide. By the method of the invention the carbide, especially tungsten carbide, can be applied to a wide variety of substrates such as the working surface of a steel tool or bearing or on carbon or boron fibres.

---

This invention relates to methods for the formation of tungsten and molybdenum carbides, or mixtures thereof.

United States Patent Specification No. 3,368,914 discloses a process for adherently depositing a metal carbide, such as tungsten carbide or molybdenum carbide on a metal substrate. In a particular process a coating of tungsten carbide is deposited upon a tungsten surface by effecting a vapour phase chemical interaction within a gaseous mixture consisting of tungsten hexafluoride, hydrogen and carbon monoxide at decomposition temperatures greater than 400° C., and preferably between about 600° and 1000° C. The carbon-containing material disclosed in the said Specification No. 3,368,914 is carbon monoxide or tungsten carbonyl and the invention claimed in this specification is limited apparently to the use of carbon monoxide; no other carbon-containing material is disclosed in the specification.

Processes involving the reaction of tungsten and molybdenum halides to form the corresponding carbides have been considered previously, especially the reaction with hydrogen and hydrocarbon vapour. It is for example stated on page 373 of "Vapor Deposition," edited by C. F. Powell et al., and published by Wiley, New York, 1966, that "As with tantalum carbide and molybdenum carbide, the deposition of tungsten carbide from a mixture of hydrogen, hydrocarbon vapor, and tungsten chloride vapor is prevented by the ease with which the free metal deposits out at a low temperature, even lower for tungsten than for tantalum." Such remarks must be taken to apply with equal or greater force to the use of the corresponding fluorides of tungsten and molybdenum. In view of the state of knowledge as evidenced by the quotation from the Powell et al. book, it is understandable that the above-mentioned United States patent specification is concerned only with carbon monoxide or tungsten carbonyl and no other carbon-containing material. It may have been thought that the formation of a carbonyl was a necessary intermediate step.

However, we have now found most surprisingly that tungsten and molybdenum carbides, if desired in the form of very hard, coherent coatings of tungsten and molybdenum carbide, can be formed by a vapour phase chemical reaction in which carbon for the formation of the carbide is provided by a hydrocarbon substance.

Accordingly, the present invention provides a method for the formation of tungsten and molybdenum carbides which method comprises effecting a vapour phase chemical reaction between a mixture of (1) tungsten and/or molybdenum hexafluoride, (2) a reactable hydrocarbon and (3) molecular hydrogen, said interaction being effected at reaction temperatures between 400° C. and 1000° C. and with a carbon to hydrogen ratio in the mixture sufficiently low to ensure that substantially no carbon is deposited as the required carbide is formed. In carrying out the reaction between the components specified it is desirable to ensure that the tungsten to carbon ratio in the reaction mixture is between 1 to 2 atoms of tungsten per atom of carbon; it is also desirable to ensure that there is sufficient hydrogen present in the reaction mixture to allow for the complete theoretical conversion of the combined fluorine of the tungsten hexafluoride to hydrogen fluoride, irrespective of the fact that in practice, in order to achieve a uniform thickness of a coating over the whole area of the article to be coated, it will be necessary to limit the completeness of conversion of the tungsten hexafluoride to hydrogen fluoride. It is further desirable that, when forming the purest carbides, the total free and combined hydrogen present in the reaction mixture should not appreciably exceed that theoretically required for the complete conversion of tungsten hexafluoride to hydrogen fluoride, since otherwise, a mixture of the metal and the metal carbide is likely to be produced.

A further aspect of the invention is concerned with the production by chemical vapour phase deposition of hard, tough coatings comprised of a mixture of tungsten (or molybdenum) and tungsten carbide (or molybdenum carbide) from a reaction mixture containing tungsten hexafluoride (or molybdenum hexafluoride), a hydrocarbon and molecular hydrogen. Although coatings of this form are less hard than those composed essentially of the pure carbide, their hardness is such that they are likely to have considerable commercial application as wear resistant coatings. For the production of such coatings the composition of the gas may be varied within wider limits than is possible for the production of essentially pure carbide coatings, the tungsten to carbon ratio in the mixture of the gases may be equal to, or greater than the 1 to 2 atoms of tungsten per atom of carbon, and the total free and combined hydrogen present may also be 50% less, equal to, or greater than that required for complete theoretical conversion of the tungsten hexafluoride to hydrogen fluoride.

It is essential in carrying out the reaction of this invention that the carbon to hydrogen ratio in the mixture is sufficiently low to ensure that substantially no carbon is deposited as the required carbide is formed. This requirement is best met by the use of hydrogen, present in sufficient amount for this purpose.

It is to be understood that in the chemical vapour deposition of tungsten carbide (or molybdenum carbide), the interaction is concerned with a metal carbide of relatively low chemical stability (in comparison with the free metal and carbon) and there is therefore a strong tendency to produce tungsten metal and carbon rather than tungsten carbide. From a mixture of tungsten hexafluoride, hydrogen and methane, the following reactions are possible:

$$WF_6 + 3H_2 = W + 6HF \quad (1)$$
$$2WF_6 + 3CH_4 = 2W + 12HF + 3C \quad (2)$$
$$2WF_6 + 3CH_4 = 2WC + 12HF + C \quad (3)$$
$$WF_6 + CH_4 + H_2 = WC + 6HF \quad (4)$$
$$2WF_6 + CH_4 + 4H_2 = W_2C + 12HF \quad (5)$$

In order, therefore, to optimise on the formation of tungsten carbide, a carbon-containing component i.e. the reactable hydrocarbon of the appropriate stability should be selected. It must decompose readily enough in combination with tungsten hexafluoride and hydrogen to produce tungsten carbide, but must not so easily be decomposed as to deposit solid carbon, or to be so stable that it cannot furnish a source of carbon for the formation of the metal carbide. Such hydrocarbons which can readily be identified by minimal experimentation at reaction temperatures between 400° C. and 1000° C. are referred to in this specification as reactable hydrocarbons. It is also apparent from the above equations and the fact that in any hydrocarbon the hydrogen to carbon atom ratio cannot exceed 4:1, that in the absence of hydrogen, contamination of the carbide with free carbon will more readily occur. Further, it is known that at least two carbides of tungsten exist, i.e. WC and $W_2C$, and we have found that either or both may be formed by the process of the invention. It is clear from stoichiometric considerations that higher proportions of hydrogen will be required to form the latter carbide; thus for example when methane is the source of carbon, equations 4 and 5 above, in their simplest form, describe the process. Twice as much hydrogen in proportion to tungsten hexafluoride is required in the latter case.

The interaction according to this invention is to be carried out at temperatures which are elevated with respect to room temperature, and specifically at temperatures between 400° C. and 1000° C. It is generally preferred to effect the reaction between components which react at temperatures between 500° C. and 900° C.; below 500° C. the rate of reaction to form the desired tungsten and/or molybdenum carbide may be slow.

In general the reaction of this invention permits the formation of tungsten and/or molybdenum carbide as a coating upon a suitable substrate and in general such coatings have been found to be coherent and adherent to the substrate at the reaction temperatures of from 400° C. to 1000° C. The use of higher temperatures, for example 1300° C. has been found to provide coatings which are less satisfactory.

However with certain substrates, for example mild steel and some other types of steel, the prior deposition, for example by chemical or electrolytic means, of a layer of nickel or cobalt has been found to be advantageous in providing better adhesion, and this is especially so if reaction temperatures are employed at the extremes of the stated range.

A most useful aspect of the present invention is concerned with the formation of a carbide coating, especially tungsten carbide, on the working surface of a tool or a bearing; for example a coating may be applied by the method of the invention to a tool having a sintered tungsten carbide/tungsten tip. Another aspect of the invention is concerned with the formation of tungsten and/or molybdenum carbide on carbon fibres to provide a continuous coating thereof. The substrate on which the carbide produced by the interaction of this invention is formed may be a powder, and the deposition of the carbide may be brought about by effecting the interaction with the particles of the powder suspended as a fluidised bed through which the three essential components are passed so that the powders are provided with the required carbide coating. Carbide coatings may be applied by the process of this invention to rollers, dies and guides, which may be formed from materials other than steel.

It will be appreciated that it is necessary for the hydrocarbons to be in gaseous or vaporous form when at the reaction temperature in order for the required vapor phase chemical inteaction to be bought about. Generally it is preferred that the reactable hydrocarbon is benzene, toluene or xylene.

Although, in the method of this invention, it is possible to dispense with the presence of free molecular hydrogen (for example where a hydrogen-rich carbon source such as methane is employed), this presence is generally desirable, as can be inferred from the discussion above; it can be seen that, even when methane is employed as the sole source of carbon, there must be a risk in the absence of free hydrogen of the codeposition of free carbon, e.g.:

$$2WF_6 + 3CH_4 \rightarrow 2WC + 6HF + C$$

When benzene is used as the carbon-containing compound in tungsten carbide formation, a suitable molar ratio of the reactants is tungsten hexafluoride: benzene: hydrogen=6:1:15.

Suitable inert gases as diluents for the gaseous mixtures of the invention include nitrogen and the noble gases, e.g. argon and helium.

It has been found further that, if large proportions of free hydrogen are present in the reaction mixtures employed in the method of the invention, proportions of free metallic tungsten and/or molybdenum are co-deposited with their carbides. Such mixed coatings are tougher than those of the carbides alone, whilst retaining much of their characteristic hardness, and their production falls within the scope of this invention. In general a useful mixed coating may contain for example 50% by weight or even more of tungsten; coatings may contain however 10% or less by weight of tungsten in elemental form.

The invention is illustrated by the following examples:

EXAMPLE 1

A gaseous mixture of tungsten hexafluoride, benzene, hydrogen and argon in respective molar ratios 6:1:15:10 was passed at a total pressure of 1 atmosphere and at a total volume flow rate of 3 litres/hour N.T.P., into a chamber containing a piece of molybdenum, 1 cm. dia., 3 cm. high heated to a temperature of 900° C. After two hours the molybdenum was cooled and removed from the chamber. An adherent and coherent coating of tungsten carbide, approximately 0.012" thick, had been produced on the molybdenum substrate. Hardness measurements made upon this coating showed it to be extremely hard, figures of up to 2100 V.P.N. being obtained.

EXAMPLE 2

A gaseous mixture of tungsten hexafluoride, benzene and hydrogen in mole ratios 6:1:15 respectively, was passed into a deposition chamber containing a piece of nickel, heated to a temperature of 680° C. for a period of 30 minutes. Hardness measurements over the cross-section of the coatings gave extremely high values ranging from 1400 V.P.N. to greater than 2000 V.P.N.

In comparable experiments in which carbon fibres were coated from a similar gas mixture at temperatures of 400° C. and 500° C., extremely abrasive coatings were obtained, indicative of a very high hardness.

We claim:

1. A method for the formation of tungsten and molybdenum carbide on the surface of a substrate which method comprises effecting a vapour phase chemical reaction between (1) a metal hexafluoride wherein the metal is selected from the group consisting of tungsten, molybdenum and mixtures thereof, (2) a reactable hydrocarbon selected from the group consisting of benzene, toluene, xylene and mixtures thereof and (3) hydrogen, said interaction being effected on the surface of the substrate and at reaction temperatures between 400° C. and 680° C. and with a carbon to hydrogen ratio in the mixture sufficiently low to ensure substantially no carbon is deposited as the required carbide is formed.

2. A method as claimed in claim 1 wherein the reaction temperature is between 500° C. and 680° C.

3. A method as claimed in claim 1 wherein component (1) of the reaction mixture is tungsten hexafluoride.

4. A method as claimed in claim 1 wherein the formation of the carbide is effected to provide a coating on a substrate consisting of mild steel and prior to the formation of the carbide coating a layer of nickel or cobalt is applied to the steel whereby improved adhesion is obtained with respect to the carbide coating.

5. A process as claimed in claim 1 wherein the reaction is carried out in the presence of an inert gas as a diluent.

6. A method as claimed in claim 5 wherein the inert gas is nitrogen, argon or helium.

7. A method as claimed in claim 1 wherein the carbide resulting from the reaction is formed on the working surface of a steel tool or bearing.

8. A method as claimed in claim 1 wherein the carbide formed as the result of the interaction is deposited on carbon fibres or boron fibres.

9. A method as claimed in claim 1 wherein the component (2) is benzene.

References Cited

UNITED STATES PATENTS

| 3,574,672 | 4/1971 | Taruer | 117—106 |
| 3,721,577 | 3/1973 | Woerner | 117—106 |

FOREIGN PATENTS

| 750,329 | 1/1967 | Canada | 117—106 |
| 1,170,218 | 5/1964 | Germany | 117—106 |

CHARLES E. VAN HORN, Primary Examiner

J. MASSIE, Assistant Examiner

U.S. Cl. X.R.

117—106 C, 119, 169 R